J. G. KERST.
SHOCKING ACCESSORY FOR HARVESTING MACHINES.
APPLICATION FILED JULY 27, 1914. RENEWED AUG. 18, 1916.

1,221,743.

Patented Apr. 3, 1917.
6 SHEETS—SHEET 1.

JOHN G. KERST
Inventor

Witnesses
Leo Matthews
Margaret Esslinger

By Fred. D. Silloway
Attorney

J. G. KERST.
SHOCKING ACCESSORY FOR HARVESTING MACHINES.
APPLICATION FILED JULY 27, 1914. RENEWED AUG. 18, 1916.

1,221,743.

Patented Apr. 3, 1917.
6 SHEETS—SHEET 6.

John G. Kerst
Inventor

Witnesses
Leo Matthews
Margaret Esslinger

By Fred. D. Silloway
Attorney

UNITED STATES PATENT OFFICE.

JOHN G. KERST, OF SPRINGFIELD, ILLINOIS.

SHOCKING ACCESSORY FOR HARVESTING-MACHINES.

1,221,743.   Specification of Letters Patent.   Patented Apr. 3, 1917.

Application filed July 27, 1914, Serial No. 853,253. Renewed August 18, 1916. Serial No. 115,680.

*To all whom it may concern:*

Be it known that I, JOHN G. KERST, a citizen of the United States, residing at Springfield, in the county of Sangamon and State of Illinois, have invented the new and useful Improvements in Shocking Accessories for Harvesting-Machines, of which the following is a specification.

My invention relates to shock-forming accessories for harvesting machines, and applies more particularly to a mechanism to be incorporated with a grain binder to coöperate therewith for performing the functions of cutting, binding and shocking of the grain.

The principal object of the invention is to provide an automatic accessory of the above character, which will receive the bundles of grain after they have been discharged from the usual binding mechanism, place them in an orderly manner in a grain shock, and later deliver the completed shock to the ground behind the moving machine.

A further object of my invention is to provide a simple and reliable means for performing the several functions required of such a device, which may be readily adapted for use with the various designs of grain binders, and which will prove efficient in operation, compact in construction, and inexpensive of manufacture.

With the foregoing general purposes in view, together with other important specific objects to be hereinafter pointed out, my invention comprises the novel details of construction and arrangement, which will be fully described herein, illustrated in the accompanying drawings, and pointed out more specifically in the appended claims.

In the annexed drawings, wherein I have illustrated the preferred embodiment of my invention, like reference characters refer to like or corresponding parts throughout the several views.

Fig. 3 is a side elevation of the shock revolving turret and frame. Fig. 4 is a diagrammatical view of the gear for longitudinally actuating the shock discharging platform. Fig. 5 is a cross section through the rear end of the framework, illustrating the method of mounting the shock discharging platform. Fig. 6 is a side elevation of the bundle receiving chute, illustrating the method of turning the bundle. Fig. 7 is a top plan view and Fig. 8 an end elevation of the cam for operating the shifting gears for actuating the shock discharging platform, the same figures illustrating the cam for operating the bundle steadying hand. Fig. 10 is a side elevation of the same mechanism. Fig. 11 is a side elevation, and Fig. 12 a top plan view of the stationary head of the clutch mechanism by which the governing drum is rotated. Fig. 13 is a vertical sectional view through the assembled clutch. Fig. 14 is a perspective view of the bundle placing basket. Fig. 18 is a top plan view, and Fig. 19 a side elevation of the device for shifting and releasing the clutch on the shaft having control of the bundle steadying hand and driving gears for the discharging platform.

Figures 15, 16, 17:
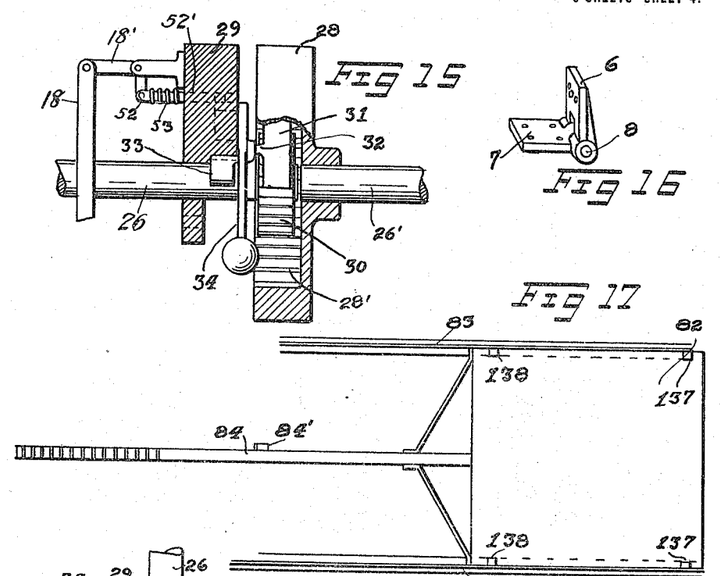
Fig. 15 is a cross sectional view of the assembled clutch by which the drum is rotated.
Fig. 16 is perspective view of the hinges connecting the harvester and shocker frames.
Fig. 17 is a top plan view of the sliding shock-discharging platform and actuating rack therefor.

The framework of my device, which may be of any suitable design, and which will be necessarily varied by its application to various types of harvesters, has been designated in general by numeral 1. I have designated the harvester by numeral 2, only a portion of that frame being diagrammatically shown, the construction of devices of that character being well known in the art, making it unnecessary to illustrate that machine in detail. The forward end of framework 1 is mounted upon axle 3, the usual wheels 4 being revoluble on the axle on each side of the framework. The method of mounting frame 1 to axle 3 is shown very clearly in Fig. 24, numeral 5 designating an upright bearing pedestal having a lateral perforation in the lower end in which axle 3 is fixed, the upper end of the pedestal 5 being bifurcated to straddle the forward cross beam of framework 1, a pivoting pin 5' passing through the bifurcated upper end of the pedestal and through the cross beam at right angles to the axle. The flexible mounting thus provided obviates the difficulties encountered by a rigid construction, when operating the device over rough and uneven ground. Frame 1 is preferably attached to the harvester frame 2 by hinged joints, which are illustrated in Fig. 16. Bifurcated brackets 6 are attached to the harvester frame 2, and eyes 7 are carried by framework 1, hinge pins 8 passing therethrough. The opposite side of the frame 1 is supported by a castor wheel 9.

Figures 1, 2:
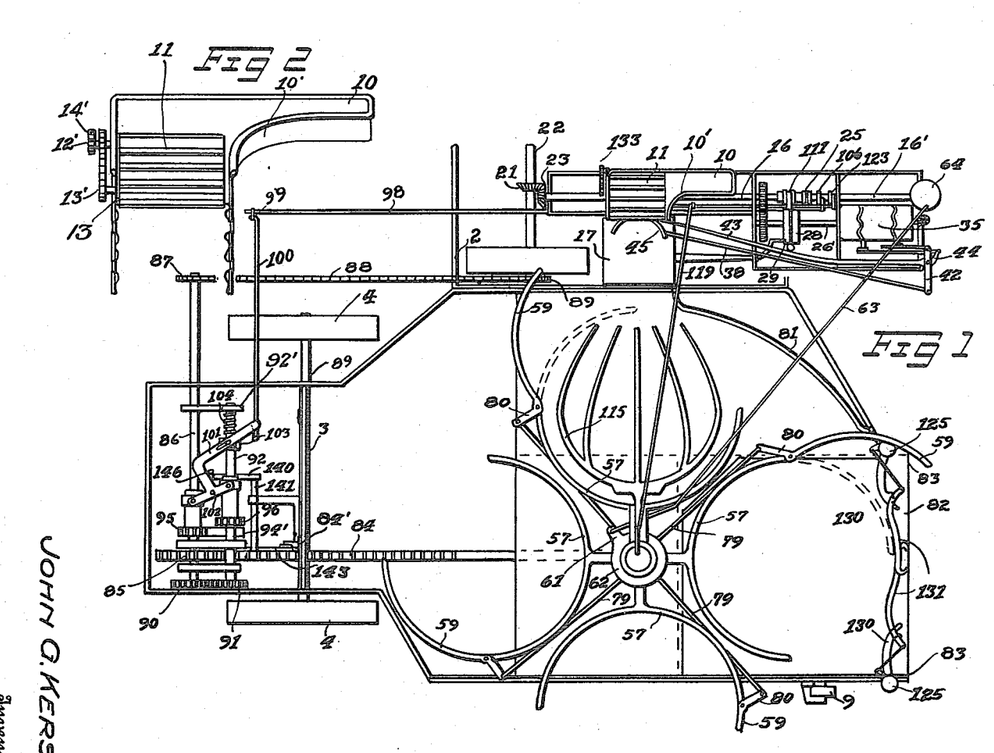
Figure 1 is a general plan view of the shocking accessory embodying my improvements.
Fig. 2 is a front elevation of the bundle receiving trough.

I provide a bundle receiving trough 10, located on the frame 2 of the harvester at the point where the bundles are delivered from the binder. Trough 10 comprises a bottom and side walls, the bundle being adapted to lie longitudinally of the travel of the machine, with the butt-end forward. The forward portion of the bottom of trough 10 is cut away, and a moving inclined conveyer belt 11 is carried in such cut-away portion, the belt being preferably elevated above the bottom of the trough at the upper end. Belt 11 is provided with cross slats and is trained over pulleys 12 and 13, the upper pulley 12 being mounted on shaft 12', driven by sprocket wheel 14'. Sprocket 14' is driven by chain 14 from sprocket 15 on shaft 16, which shaft is driven by means which will be hereinafter fully described. The lower pulley 13, over which the belt 11 is trained being located below pulley 12, and in a line considerably farther out from the point of delivering of the bundle, the butt of the grain bundle when brought into contact with the belt 11, will be engaged by the cross slats on the belt and drawn downward. The side wall of trough 10, is rounded at 10' allowing the bundle to be turned downward at the butt-end, and slightly outward toward the shocking device, the width between the two side walls being predetermined to allow only sufficient resistance to the head of the bundle to prevent uncertain movement during this operation.

Below trough 10, I provide a bundle re-receiving platform 17, which is supported by a horizontal arm 18 pivoted to bracket 19, which bracket is suspended below the harvester frame 2. As the bundle is drawn downward by belt 11, gravity will further actuate the bundle and it will fall butt-end downward onto receiving platform 17. Platform 17 will swing slightly downward about the pivoting point 20 in bracket 19, and the rear end of arm 18 will be actuated upward. The rear end of arm 18 is curved upward and toward the harvester, where it is engaged with the governing mechanism having control of the bundle placing device. This movement by arm 18 will set in motion the bundle placing device, the construction and operation of which will now be explained.

I provide a bevel gear 21 fixed to the main harvester axle 22, which axle is in continuous rotation when the harvester is in operation. At right angles to and meshing with gear 21, is a bevel gear 23 mounted on the longitudinally disposed shaft 16. Shaft 16 is provided with a spur gear 24 adjacent the center of its length, and a disengaging ratchet clutch 25 rearward of gear 24, whereby a continuation shaft 16' may be engaged or disengaged. A second shaft, designated as 26 is mounted parallel to shaft 16, and a spur gear 27 is carried thereon. Gears 24 and 27 being in mesh, the shaft 26 will be thus rotated by shaft 16. Shaft 26 comprises two sections, the rear section being designated by numeral 26', a novel clutch means being provided for engaging and disengaging the two sections. On the forward end of the rear section 26' is fixed a circular head 28, provided on its forward face with a recess, on the outer circumference of which recess are ratchet teeth 28'. A stationary head 29 is mounted to the frame 2 parallel to and spaced from head 28, and the rear end of the forward section 26 is adapted to rotate therein. A ratchet gear 30 is fixed to the shaft 26 within the recess in head 28, the ratchet being adapted to revolve within the recess. Mounted to rotate in head 29, between the outer periphery of ratchet 30 and the ratchet 28' is a catch 31, a pin 32 passing through a sliding arcuate bracket 33 pivoting the catch. The pivoting pin 32 also pivots a weighted arm 34, the arm and catch being mounted to revolve in bracket 33. Bracket 33 has an arcuate base, adapted to slide in an arcuate recessed slot 33' provided in the rear face of stationary head 29, whereby the position of pin 32 and catch 31 may be shifted. Catch 31 is adapted, when the clutch is in its engaged position, to span between ratchet teeth 28' and ratchet wheel 30, thus imparting the rotation of ratchet 30 and the forward end of shaft 26 to the head 28 and the rear section 26' of shaft 26.

Parallel to and above the rear end of shaft

Figure 9:
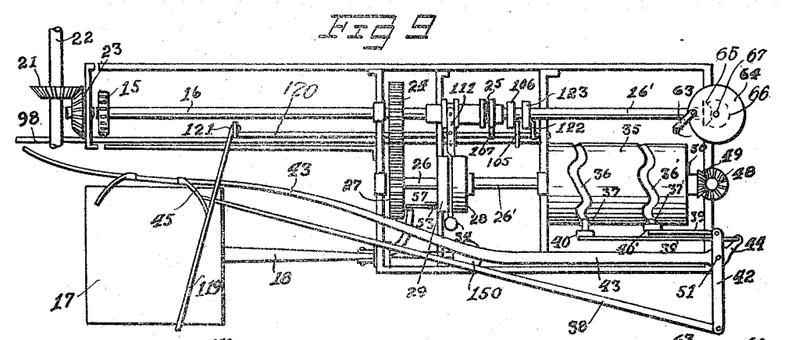
Fig. 9 is an enlarged plan view of the automatic governing device and the bundle placing arms.
Figures 10, 11, 12, 13, 14:
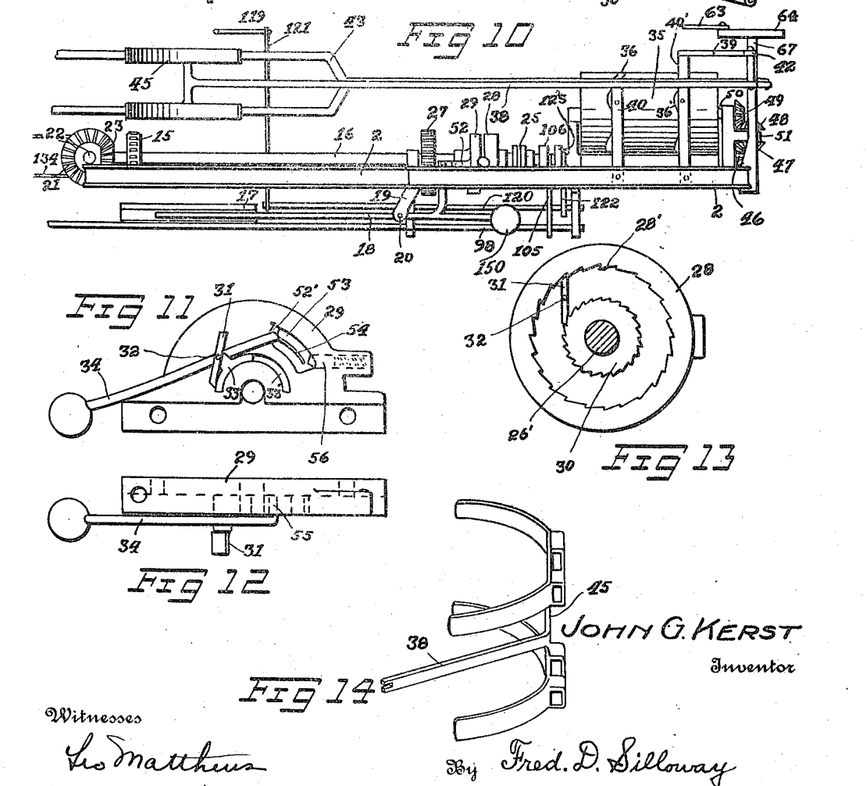

26', is a governing drum 35, wherein novel means are provided for actuating the bundle placing apparatus. Drum 35 is mounted on shaft 50, driven from shaft 26' by bevel gears 46 and 49, through the medium of vertical shaft 51 having bevel gears 47 and 48 in mesh, respectively, with gears 46 and 49. On the outer surface of drum 35, are cam grooves 36 and 36', which grooves are adapted to receive stub shafts 37 and 37', respectively. Groove 36' is adapted to actuate the movement of the bundle placing arm 38, an upright lever 40' pivoted at its lower end to the harvester frame to swing forward and rearward at its upper end, being in fixed engagement with stub shaft 37', and the motion of said lever being transmitted to link 39, and through pivoted horizontal lever 42, to the arm 38. Groove 36 is adapted to actuate the movement of delivering arm 43, an upright lever 40 pivoted to the harvester frame to swing forward and rearward at its upper end being in fixed engagement with stub shaft 37, and the motion of said lever being transmitted to link 39' and through bell-crank 44, to arm 43. On the forward end of arm 38 is fixed a bundle basket 45, comprising a pair of superposed semi-circular arms. Basket 45 is slidably engaged on the back thereof to the bifurcated forward end of delivering arm 43, and the movement of arm 38 is such that the basket 45 will be moved substantially longitudinally on arm 43. Arm 43 swings outward across the shock forming platform about the pivoting point 51, whereby the grain bundle will be engaged by basket 45, and placed in position on the shocking floor carried on framework 1.

It will be understood that in forming the grain shock, it will be necessary to provide a plurality of different concerted movements for arms 43 and 38. In my present embodiment I prefer to form the shock of seven bundles of grain, and seven different shock-delivering motions are performed by the arms. Cam grooves 36 and 36' are formed suitably to actuate stub shafts 37 and 37' respectively, in order to accomplish this movement of the arms in an orderly and methodical manner.

The initial downward actuation of platform 17, caused by the delivery thereto of the first bundle of grain to be placed in a shock, will actuate the rear end of arm 18 forwardly about pivoting point 20 in bracket 19. A horizontal pin 52 is pivoted through the medium of a bell-crank 18' to the upper end of the curved rear end of arm 18, the rear end of which pin is normally inserted in a hole 52' therefor through stationary head 29 of the clutch mechanism on shaft 26. Pin 52 is normally held in position protruding into the upper end of arcuate slot 53. Slot 53 is adapted to receive a stub pin 55 carried by weighted lever 34, and to allow the pin to travel therein, and the function performed by the end of pin 52 is to prevent the travel of the stub pin by protruding into the path thereof. It will therefore be seen that when pin 52 is drawn forward out of the path of travel of stub pin 55, the stub pin and weighted arm 34 will be free to swing upward about pivoting point 32. Normally catch 31 is out of engagement between ratchet 30 and the ratchet teeth 28' in head 28, pin 52 preventing engagement, but upon removal of pin 52, and upon the upward movement of the inner end of arm 34, catch 31 will be swung slightly with the arm about pivoting point 32, and will form an operative engagement between the continuously revolving ratchet 30 and the ratchet teeth 28'. Rotation will thus be transmitted to the rear section 26' of shaft 26, and to the drum 35, whereupon the first bundle of grain will be delivered to its position on the shocking floor, and the arms returned to their normal position. At this point stub pin 55 will have been actuated along the outer side of arcuate groove 53 in head 29 by catch 31 and ratchet 30, bracket 33 being also moved around in its arcuate slot 33', when the stub shaft 55 will encounter a slight variation from the arc, adapted to force the pin inward adjacent the lower end of the slot. The protruding end of a spring actuated pin 56 will be encountered, the stub shaft 55 engaging the pin and pushing it out of the path of travel against the opposite actuation of its spring. Stub pin 55 will travel to the lower end of the slot 53, whereupon the spring will force the pin 56 to its normal protruding position to prevent access to the outer side of slot 53. Pin 55 may then travel unimpeded upward along the inner side of the slot, the weight on the arm 35 actuating such movement, a partition fin 54 being positioned centrally of the slot to confine the stub pin 55 to travel in the desired path. At the end of the travel upward, further movement in the slot will be prevented by pin 52, which will have been returned to its normal position by spring 53.

The remaining different movements will be similar to the motion just described, and it is not thought necessary to describe them in detail. Cam grooves 36 and 36' will effect the necessary movements of arms 43 and 38, when each succeeding movement is initiated by the falling of a succeeding bundle of grain on the platform 17, and the consequent withdrawal of pin 52 from engagement with stub pin 55.

Figures 3, 4, 5, 6, 7, 8:
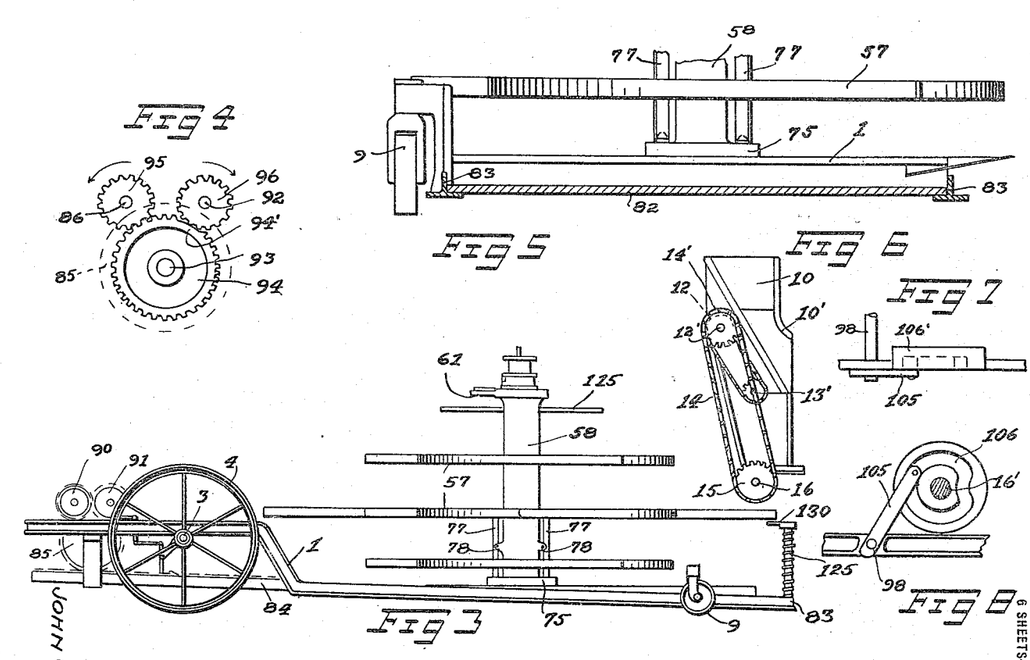
Figures 20, 21, 22:
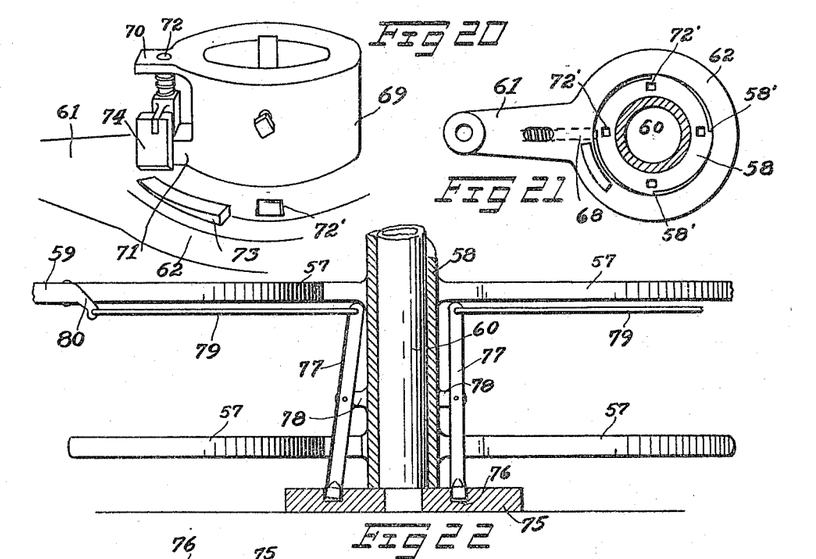
Fig. 20 is a perspective view of the turret lock and ratchet release.
Fig. 21 is a top plan view of the turret actuating ratchet and arm.
Fig. 22 is a section through the turret, showing means for actuating the extensions of the bundle receiving yokes.
Figures 26, 29:
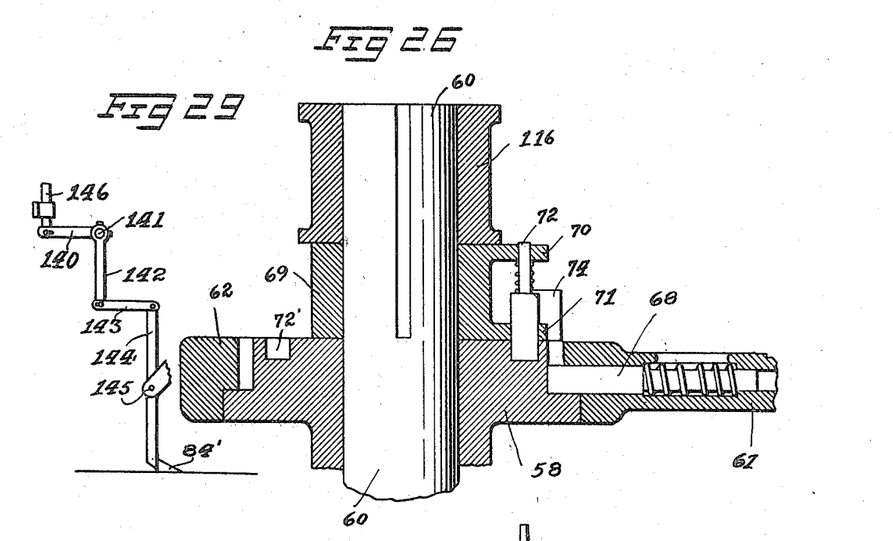
Fig. 26 is a vertical section through the turret post, turret and ratchet.
Fig. 29 is a side elevation of the mechanism for actuating the lock pin for the gear shifting device.

The grain bundles are positioned on the shocking floor directly within parallel superposed shock-receiving yokes designated by numeral 57, of which there are four sets equally spaced about a central turret 58. Yokes 57 are semicircular in shape and are adapted to embrace the shock, a hinged extension arm 59 being pivoted to the forward end of each yoke to further embrace the shock after it is formed. Turret 58 and yokes 57 are revoluble about a central post 60, the shock when formed being revolved one-quarter of a revolution thereby to a position directly rearward of the post 60. Another set of yokes will be simultaneously revolved to the receiving position. The revolution of turret 58 is effected by the crank arm 61 carried by the ratchet 62 on the upper end of the turret, a reach rod 63 being pivoted to the crank arm 61, and extended diagonally acoss the machine to horizontal crank disk 64 rotated by shaft 16' through bevel gears 65 and 66 and upright shaft 67, gear 65 being fixed to shaft 16', and gear 66 being fixed to the lower end of shaft 67, to which the crank disk 64 is attached. Movement of arm 61 being thus effected, clutch 62, which is adapted to engage turret 58 during clockwise movement of the clutch, will draw turret 58 around in that direction. Clutch 62 is provided with a circular inside bearing about the turret, ratchet teeth 58' being provided on the outer periphery of the turret. A spring actuated pin 68 is carried on the arm 61, and is adapted to normally protrude against the turret. Teeth 58' will engage said pin, thus engaging the clutch ring 62 in operative relation to the turret. When reach rod 63 has been drawn to the limit of its rearward travel by crank disk 64, it will be reversed by the further rotation of the disk, and will travel forward. Arm 61 and clutch ring 62 will thereby be reversed to travel counter-clockwise, and such motion will not be transferred to the turret, since the ratchet teeth are tapered in the opposite direction. The counter-clockwise movement of the clutch is only for sufficient distance to allow the next ratchet tooth on the turret to engage pin 68.

At the point in the clockwise rotation of turret 58, when the arm 61 has moved the turret to the limit of travel of that arm, means is effected for locking the turret from further movement. This means comprises a collar 69 fixed to the central stationary post 60 of the turret, collar 69 being provided with parallel horizontal projecting lugs 70 and 71, through which a vertical lock pin 72 is adapted to slide. Between upper lug 70 and a shoulder on pin 72 is disposed a coil spring, adapted to normally force pin 72 downward through lower lug 71 into engagement with the upper horizontal face of turret 58. A series of four spaced apart holes 72' are provided in the upper face of the turret in position to register with and receive the pin at the predetermined points marking the limit of travel desired for the turret, which is shown as one-quarter of the complete revolution of the turret.

Pin 72 will thus lock the turret in position during the counter-clockwise movement of clutch 62. In order to raise pin 72 from engagement with one of the holes 72', I provide a wedge shaped projection 73 on the upper face of clutch 62, adapted to engage a pivoted block 74 carried parallel to and slightly farther out from its center of rotation than pin 72. Block 74 will normally travel just above the face of the clutch, and when wedge 73 is encountered, the block will be raised thereby, the block in turn raising pin 72 from the hole 72', thus unlocking the engagement between the lock pin 72 and the turret. In order to accomplish the foregoing unlocking operation, I prefer to provide considerable over-travel for the ratchet ring, which will allow the wedge to raise pin 72 completely out of hole 72', before the ratchet will be engaged by pin 68.

Figures 23, 24, 25:
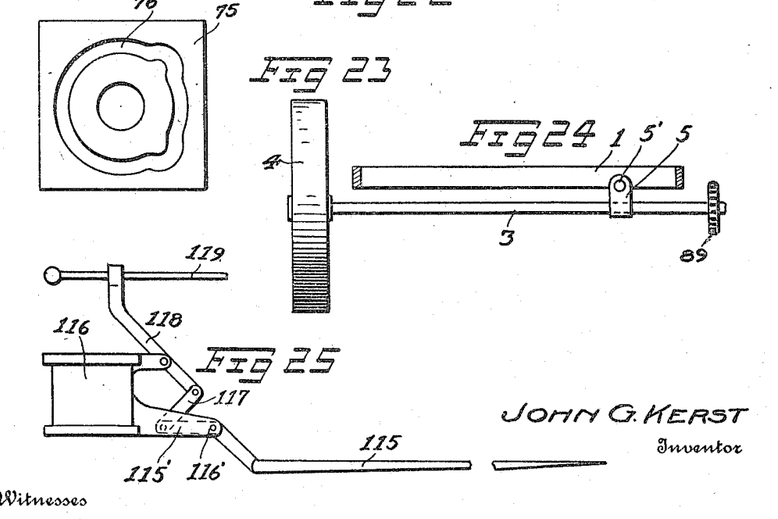
Fig. 23 is a plan view of the cam for actuating the above extensions.
Fig. 24 is a sectional view through the framework, showing the front axle frame supporting means in rear elevation.
Fig. 25 is a side elevation of the device for actuating the bundle steadying hand.

A simple and effective device is provided for opening and closing the extensions 59 carried by the upper shock receiving yoke 57, it being understood that such extension arms are preferably normally closed, except during that portion of the revolution when the turret is stationary to receive a shock or to discharge the same. Arms 59 of which there are four are each provided on their pivoted ends with a bell-crank lever 80, a horizontal link 79 extending inward therefrom to the upper end of a vertical lever 77. Levers 77 are each fulcrumed adjacent the center of their lengths by means of pivoting pins passing through lugs 78 on the turret. Levers 77 together with the arms and links travel with the turret about central post 60, which post is anchored in bearing plate 75 supported by the framework 1. The upper face of plate 75 is provided with cam groove 76 in which the lower free ends of levers 77 are adapted to travel. When one set of the receiving yokes 57 has been rotated to the point just prior to reaching the position to receive the bundles of grain from the platform 17, a variation in groove 76 is reached by the corresponding lever 77, and the lever will be actuated outward at the bottom, thus drawing link 79 inward and actuating bell-crank 80 to throw the free end of arm 59 outward. At this point the turret will have reached its position of rest. Upon the completion of the shock, and upon the initial movement of the turret in transferring the shock, lever 77 will be thrown inward at its lower end, thus swinging arm 59 inward about the shock, where it will remain until the lever is actuated by another variation, which is positioned to operate upon the shock being delivered to the discharging device. After the shock has been discharged, and upon rotation of the turret thereafter, the arm will be returned to its closed position and remain closed until again actuated by the mechanism just described.

In order to prevent tilting of the shock in the direction of the opening between the ends of yoke 57 and arm 59, during the travel from the shocking floor to the discharging position, I provide a guard rail 81, attached to framework 1 just rearward of the shocking floor, the guard being curved to conform to the travel of the shock about post 60.

Upon the delivery of the grain shock to the discharge position directly rearward of turret post 60, a means for discharging the shock upon the ground is automatically brought into play. A longitudinally slidable floor 82 is provided just rearward of post 60, to receive the shock from the stationary shocking floor, slidable floor 82 being mounted to shift in guide irons 83 suspended below frame 1, and disposed with the rear ends just above the ground and the forward ends considerably higher, providing an inclined slideway for floor 82. The forward edge of floor 82 is fixed to a longitudinally extending actuating arm 84 provided with a gear rack on its upper face, which rack is in mesh with actuating gear 85 suspended from the framework 1. Gear 85 is actuated from axle 22, through the medium of either set of two chains of gears, one chain providing rearward actuation of rack 84, and the other chain providing forward actuation thereof.

The method of actuating gear rack 84 has been previously disclosed in a former application for Letters Patent, bearing Serial No. 778,413, filed June 10, 1913, but important improvements are now incorporated therewith, in the method of automatically shifting the gears, and it is thought necessary to briefly describe the operation of the driving device in order to more clearly disclose the new features.

Numeral 86 designates the lateral drive shaft mounted to bearings in frame 1, a sprocket gear 87 being attached to the harvester end of the shaft, which sprocket is driven by a chain 88 from sprocket gear 89 fixed to rotate with axle 22 of the harvester. On the opposite end of shaft 86 is fixed a spur gear 90 in mesh with a second spur gear 91 carried by shaft 92. Shaft 92 is parallel to shaft 86, and is mounted to rotate in bearings in frame 1. A third lateral shaft 93 is disposed between and below shafts 86 and 92, and gears 85 and 94 are fixed thereto, gear 85 being in mesh with rack 84, and gear 94 positioned to be driven, selectively, by gears 95 and 96, mounted to rotate with shafts 86 and 92, respectively. Gears 95 and 96 are mounted to slide laterally into and out of mesh with gear 94, a lever 102 therefor being provided, and automatic means incorporated therewith for operating the same. It will be seen that upon the forward movement of the harvester, axle 22 will drive shaft 86 in a counter-clockwise direction as viewed in Fig. 4, and that gear 90 will drive gear 91 and shaft 92, in a clockwise direction. Upon the meshing of gear 95 on shaft 86 with gear 94 on shaft 93, gear 85 will be rotated in a clockwise direction, thus actuating gear rack 84 and platform 82 forward. Upon the meshing of gear 96 with gear 94, the opposite direction of travel will be imparted to platform 82. Gear 94 is provided with a blank portion 94' in its periphery, in order to insure a limited movement in either direction. When the driving gear reaches that blank portion, further movement of the platform will cease.

The automatic means for shifting the gears 95 and 96, at the proper point in the operation of the entire device, will now be described, it being understood that it is the purpose of such mechanism to withdraw the floor 82 from beneath the shock, when the shock is rotated by turret 58 to the floor 82.

On shaft 16', just rearward of clutch 25, is a cam 106 adapted to be rotated by that shaft, and provided with a cam groove in operative relation to a stub pin carried by a crank arm 105. Crank arm 105 is keyed to an oscillating longitudinal shaft 98, on the forward end of which is a relatively short vertical crank arm 99. To the outer end of arm 99 is pivoted a connecting rod 100 extended laterally across the intervening space to pivotally engage the L-shaped arm 101 of the gear shifting lever 102. Lever 102 is fulcrumed between shafts 86 and 92, and each end thereof is pivoted to collars carried by the sliding gears 96 and 95, respectively. It will be seen that lateral movement of connecting rod 100 will actuate lever 102, to throw gears 95 and 96 selectively, into mesh with gear 94. Rod 100 is preferably longer than required, that is it is allowed to extend through arm 101 a short distance, in order to provide over travel to insure flexibility of the entire machine when in operation on uneven ground. A coil spring 104 carried about shaft 92 is disposed between a stationary bearing 92' and a loosely fitting collar 103 carried by shaft 92, the collar being positioned under L-shaped arm 101 and pivoted thereto by a pin in the collar protruding upward into a longitudinal slot in arm 101. It will be seen that the spring 104 will normally actuate arm 101 to draw connecting rod 100 toward the driving mechanism, thus providing the desired tension to insure accuracy of operation of the shifting device.

In order to lock arm 101 in position, I provide a lock pin 146, positioned to be raised to engage the arm when the arm is moved to its extreme travel toward the harvester. Pin 146 is pivoted to a crank arm 140 fixed to lateral shaft 141, on the outer end of which is a downward extending crank arm 142. A link 143 is pivoted to the lower end of arm 142, and to the upper end of a lever 144. Lever 144 is fulcrumed adjacent its center to the shocker frame, and the lower end of the lever is free, being positioned to be engaged by a lug 84', carried on the side of actuating arm 84 of the platform. When the platform has been drawn forward to a predetermined point, lug 84' will actuate lever 144, and the pin 146 will be drawn down to disengage arm 101, allowing the shifting device to operate.

Figures 18, 19:
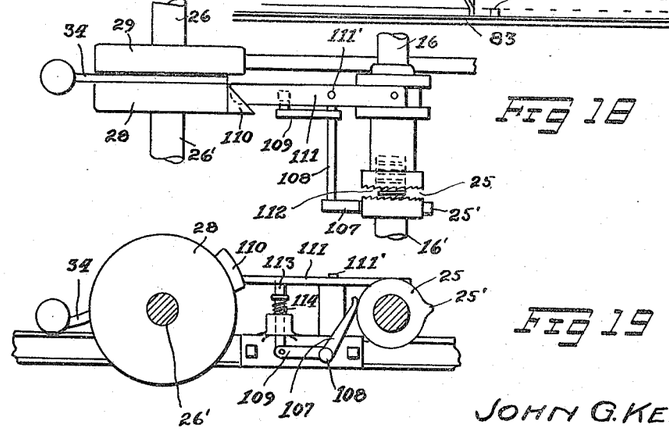

This operation is primarily initiated by the engagement of clutch 25, thus throwing into rotation shaft 16', the forward section 16 being in continuous rotation. This engagement is effected by the mechanism shown in Fig. 18, a tooth 110 being positioned on the periphery of revolving head 28 on shaft 26', which tooth is tapered to force the free end of a clutch shifting lever 111 slightly forward about pivoting point 111', thereby throwing the sliding collar attached to the forward head of clutch 25, into engagement with the rear head. The adjacent faces of the clutch heads are preferably toothed to mutually engage, a spring 112 being counter-sunk into the adjacent faces to normally prevent engagement. Upon the movement of lever 111 by lug 110 slightly forward at its free end, pin 113, normally prevented from upward movement by engagement on the under side of lever 111, will be free to be actuated upward by spring 114, thus to hold lever 111 and the rear head of clutch 25 in engagement. At the predetermined point when the rotation of shaft 16' is no longer required, a tooth 25' on the periphery of the rear head of clutch 25 is positioned to engage a lever 107 fixed to rotate shaft 108, and thereby crank arm 109. Arm 109 is in operative engagement with the lower end of pin 113, and adapted to draw the pin downward, thereby allowing lever 111 to swing back to its normal position, actuated by the spring 112.

During the operation of forming the shock, a means is provided for steadying the bundles. A hand 115 comprising a plurality of horizontal fingers is mounted to a stationary collar 116 fixed to post 60 and adapted to be suspended over the shocking floor just high enough thereabove to slightly engage the bundle heads where the shock is being formed. Collar 116 comprises a fulcrum 116', to which is pivoted the hand 115, a bell-crank 115' on the inner side of the hand being pivoted to a link 117. Link 117 is engaged by a pivoted lever 118, to which an actuating reach rod 119 is pivoted. Rod 119 is actuated back and forth by a longitudinal oscillating shaft 120, carrying a vertical crank arm 121 on its forward end, the rear end of the shaft being provided with an arm 122, engaged in operative relation with a cam groove on the rear face of cam 123 rotated by shaft 16'.

Figures 27, 28:
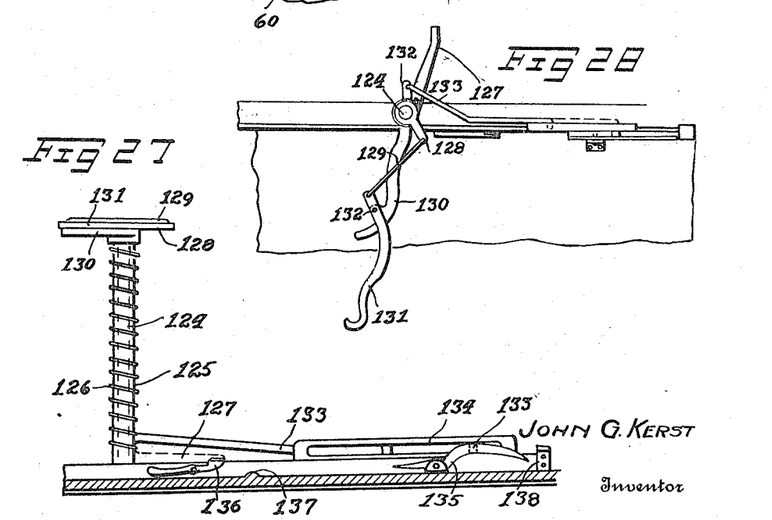
Fig. 27 is a side elevation of the shock supporting post and arms.
Fig. 28 is a top plan view of the same mechanism.

In order to support the grain shock when the sliding discharge floor is being withdrawn from beneath the shock, I provide corner posts 124 fixed to the framework 1 at each of the rear corners, about each of which posts rotating sleeve 125 is disposed. A coil spring 126 is carried about the sleeve, the upper end thereof being engaged to a stationary arm 128 provided on the post. The lower end of the spring is engaged to an arm 127 carried on the lower end of sleeve 125, the arm and sleeve being thus normally actuated about the post by the spring. The shock supporting arm 130 is fixed to the upper end of sleeve 125 and is adapted to normally extend inward from the post across the rear end of the accessory, an extension arm 131 being pivoted thereto at point 132. A link 129 is pivoted on one end to a bell-crank extension on the pivoted end of arm 131, the link being pivoted on its other end to the stationary arm 128. The arm 127 on the lower end of sleeve 125 is normally positioned to engage a catch 136 pivoted to the framework 1, thus to allow the arms 130 and 131 to extend across the rear edge of the discharging floor, but upon the forward movement of that floor, a lug 137 carried by the floor will engage and actuate the catch out of locking relation to arm 127. The supporting arm will then be free to swing against the shock, actuated by spring 126. The tension of the spring is preferably only sufficient to allow the arms to rest lightly against the shock, and to give as the machine advances, stationary arm 128 drawing the bell crank end of arm 131 about pivoting point 132, through the medium of link 129. This affords a flexible support, allowing the shock to be deposited upon the ground without the bundles being scattered from their shocked relation.

When the major portion of the shock has been deposited on the ground, that is, when the discharging floor has been drawn from beneath the greater part of the shock, I provide an automatic means for withdrawing the supporting arms from engagement with the shock. This means comprises a longitudinally extending reach rod 133 pivoted to arm 132 on each of the sleeves 125, the rear end of the rod being bent inward at right angles to the guide irons of the framework, and entered into a longitudinal guide slot 134 provided therefor. The bent end of rod 133 is designated as 133', and a catch 135 is pivoted to travel with floor 82 and to engage the rod at a predetermined point. The rod will thereby be moved along slot 134, and the sleeve 125 and arms 130 and 131 will be swung out of engagement with the shock. To release the engagement between catch 135 and rod 133', a wedge shaped extension is provided on catch 135 adapted to engage with a stationary abutment 138 on the frame. As the extension is forced beneath the abutment by the movement of the floor, the catch will be swung down disengaging rod 133. When the floor returns to its shock receiving position, lug 137 will engage latch 36, and sleeve 125 and arms 130 and 131 will be thrown around by spring 126 to their normal position.

From the foregoing description, the construction of my device may be readily understood, it being clearly seen that I have provided an automatic shocking accessory for a harvester, which will perform the several functions of shocking the grain bundles in an orderly and effective manner.

While I have herein described and shown a preferred embodiment of my invention, I do not wish to be limited strictly to the details shown, as it is obvious that the details of construction and arrangement may be varied in many ways, without departing from the broad spirit of my invention.

Having thus described my invention, what I claim is:—

1. In a shocking accessory for a grain harvester, the combination of a horizontal longitudinally extending bundle receiving trough positioned to receive the grain bundles from the harvester, a moving conveying belt positioned at the discharge end of said trough and traveling at right angles to the receiving trough to engage the butt-end of the bundles and to actuate them downward and outward toward a bundle shocking floor, said bundle receiving trough comprising a curved longitudinal wall adjacent the belt about which the bundles may be turned, a bundle shocking floor, and automatic means for shocking the grain bundles delivered from said trough to said floor, substantially as described.

2. In a shocking accessory for a grain harvester, the combination of a horizontal longitudinally extending bundle receiving trough positioned to receive the grain bundles from the harvester, conveyer means for delivering the grain bundles from the trough to a bundle receiving platform, a bundle receiving platform positioned to receive the bundles from the delivery means, an arm supporting said bundle receiving platform pivoted to allow the platform to be actuated downward by the weight of a grain bundle deposited thereon, said arm provided with an extension adapted to engage means for setting in motion a bundle placing device upon the actuation of the platform, and a bundle placing device and means for actuating the same for the delivery of the grain bundles consecutively to the grain shock, substantially as described.

3. In a shocking accessory for a grain harvester, the combination of a bundle receiving platform positioned to receive the bundles of grain from a harvester in a substantially vertical position with the butt-end down, a bundle placing device comprising a swinging arm, a bundle basket slidably attached thereto, a second arm attached to the bundle basket to actuate the basket longitudinally along the swinging arm, and means for swinging said arms and the bundle basket to deposit the bundle in the grain shock, substantially as described.

4. In a shocking accessory for a grain harvester, the combination of a bundle placing device comprising a swinging arm, a bundle basket slidably attached thereto, a second arm attached to the bundle basket to actuate the basket longitudinally along the swinging arm, and actuating means for said arms comprising a revoluble drum, cam grooves in said drum, vibrating levers adjacent the drums, and stub pins in said levers engaging the cam grooves on said drum, links pivoted to said levers, a bell-crank engaged to one of said links and to the swinging lever, a pivoted lever engaged to the other of said links and to the second arm attached to the bundle basket, and means for revolving the drum at the predetermined points in the operation of the accessory, substantially as described.

5. In a shocking accessory for a grain harvester, the combination of a bundle placing device comprising a swinging arm, actuating means for said swinging arm comprising a revoluble drum, a cam groove in said drum, a vibrating lever pivoted adjacent the drum, a stub pin in said lever engaging the cam groove on said drum, a link pivoted to said lever, a bell-crank engaged to said link and in operative engagement with the swinging arm, a drive shaft for said drum, a continuously rotating shaft in line therewith, a clutch means for engaging the two shafts, said clutch means comprising a stationary head, the continuously rotating shaft rotating in said stationary head, a ratchet wheel on the engaging end of the continuously rotating shaft, a second clutch head spaced from the stationary head and fixed to the drum shaft, a recess in said second clutch head provided with ratchet teeth, a catch pivoted in the stationary head and adapted to span between the ratchet teeth in the second clutch head and the ratchet gear on the continuously moving shaft, an arcuate sliding pivoting block in the stationary head providing pivoting means for the catch, a weighted lever fixed to said catch, a pin in said weighted lever adapted to enter an arcuate groove in the stationary head, a lock pin protruding through the head to prevent the weighted lever from actuating the catch into the engaged position between the rotating ratchet and the ratchet teeth in the second clutch head, said lock pin in operative relation to a pivoted arm supporting a bundle receiving platform, and a bundle receiving platform supported by a pivoted arm in position to actuate the lock pin from its locking position, substantially as described.

6. In a shocking accessory for a grain harvester, the combination with means for placing grain bundles in a shock, of a rotating turret, semi-circular superposed yokes spaced about the turret and attached thereto, said yokes adapted to be successively positioned over the shocking floor to there receive the grain bundles and to be further rotated to transfer the grain shock to a position to be discharged from the device, crank disk means for rotating said turret, and means for setting said rotating means in gear at predetermined points in the operation of the accessory comprising a horizontal shaft in continuous rotation, a second shaft in operative relation with said disk and in line with said first shaft, clutch heads on the adjacent ends of said shafts, the clutch head on the second shaft slidable thereon, a lever pivoted to engage the sliding clutch head and to actuate it into operative relation with the continuously rotating head on the first shaft and comprising a lug spaced to engage said pivoted lever thereby to actuate the sliding clutch head into operative relation with the rotating shafts, substantially as described.

7. In a shocking accessory for a grain harvester, the combination with a rotating turret for receiving and transferring the grain shocks, of means for rotating said turret comprising a ratchet carried about the turret to engage therewith during the rotation of the ratchet in a clockwise direction, an actuating arm on said ratchet, a reach rod pivoted to the actuating arm, a revoluble crank disk engaging the reach rod, and means for rotating said crank disk at predetermined points in the operation of the accessory comprising a horizontal shaft in continuous rotation, a second shaft in operative relation with said disk and in line with said first shaft, clutch heads on the adjacent ends of said shafts, the clutch head on the second shaft slidable thereon, a lever pivoted to engage the sliding clutch head and to actuate it into operative relation with the continuously rotating head of the first shaft, a third rotating shaft parallel to the first shaft and comprising a lug spaced to engage said pivoted lever thereby to actuate the sliding clutch head into operative relation with the rotating shaft, substantially as described.

8. In a shocking accessory for a grain harvester, the combination with a rotating turret for receiving and transferring the grain shocks, crank disk means for rotating said turret, and means for setting said rotating means in gear at predetermined points in the operation of the accessory comprising a horizontal shaft in continuous rotation, a second shaft in operative relation with said disk and in line with said first shaft, clutch heads on the adjacent ends of said shafts, the clutch head on the second shaft slidable thereon, a lever pivoted to engage the sliding clutch head and to actuate it into operative relation with the continuously rotating head on the first shaft, a third rotating shaft parallel to the first shaft and comprising a lug spaced to engage said pivoted lever thereby to actuate the sliding clutch head into operative relation with the rotating shaft, substantially as described.

9. In a shocking accessory for a harvesting machine, the combination with means for shocking the bundles of grain and transferring the shock to a discharging floor slidable from beneath a grain shock in an inclined plane longitudinally of the machine, a slideway for said floor comprising angle guides attached to the accessory frame, an actuating bar fixed to the forward end of said floor, a gear rack on said bar, an actuating gear in mesh with said rack, a drive shaft for said actuating gear, a drive gear fixed to said drive shaft and comprising a blank portion in its periphery, continuously rotating forward and reverse gears adapted to mesh selectively with said drive gear, and automatic means for shifting said gears, substantially as described.

10. In a grain shocking accessory for a harvesting machine, the combination with a shock discharging floor slidable from beneath a grain shock transferred thereto, of means for sliding said floor longitudinally of the accessory comprising an actuating bar for said floor, a gear rack on said bar, an actuating gear and shaft therefor, a drive gear on said shaft, continuously rotating slidable forward and reverse gears adapted to mesh selectively with said drive gear, and automatic means for shifting said gears comprising a lever pivoted between said gears and in operative relation with the gears, an arm on said lever, a reach rod pivoted to said arm, a longitudinally extended oscillating shaft, a vertical crank arm on the forward end of said shaft, a reach rod pivoted to said crank arm, a second crank arm on the rear end of the oscillating shaft, a cam fixed to rotate with a governor shaft, the governor shaft in operative relation to the main axle of the harvester, a cam groove on said cam adapted to actuate said second crank arm at a predetermined point in the operation of the accessory, substantially as described.

11. In a shocking accessory for a grain harvester, the combination with a rotating turret for receiving and transferring grain shocks, of semi-circular yokes spaced about the turret and attached thereto, a pivoted extension on each of said yokes positioned to embrace the grain shock, a bell-crank on the inner end of said extension, a horizontal link pivoted to the bell-crank, a vertical actuating lever fulcrumed adjacent the center of its length to the rotating turret, said link pivoted to the upper end of the actuating lever, a stationary cam groove positioned to engage the lower end of the actuating lever and to form the path of travel for the lever during rotation of the turret, and said cam groove provided with variations spaced to actuate the end of the lever to open and close the pivoted extensions at predetermined points in the operation of the accessory, substantially as described.

12. In a shocking accessory for a grain harvester, the combination with a rotating turret having yokes for receiving the grain bundles in the formation of a grain shock, of a shocking floor rearward of the turret, a bundle steadying hand positioned above the shocking floor, said hand provided with a plurality of fingers positioned to loosely engage the heads of the grain bundles being placed in the shock, and means for lowering and raising said hand at predetermined points in the operation of the accessory, substantially as described.

13. In a shocking accessory for a grain harvester, the combination with a rotating turret having yokes for receiving the grain bundles in the formation of a grain shock, of a shocking floor rearward of the turret, a bundle steadying hand positioned above the shocking floor to loosely engage the heads of the grain bundles being placed in the shock, said hand pivoted on its inner end to a horizontal bell crank, a lever fulcrumed at a stationary point, a link pivoted to the bell-crank and to the lever, a laterally extending reach rod pivoted to the lever, a longitudinally extending oscillating shaft, a vertical crank arm on the forward end of said shaft, said reach rod pivoted to said vertical crank arm, a second crank arm on the rear end of the oscillating shaft, a cam in operative relation with the second crank arm, a shaft for revolving said cam, and means for rotating said shaft and cam at predetermined points in the operation of the accessory, substantially as described.

14. In a shocking accessory for a grain harvester, the combination with a rotating turret for receiving and transferring the grain shocks, of a ratchet ring carried about the turret, a horizontal crank arm on said ratchet ring, ratchet teeth on the turret, a spring actuated pin in said ratchet ring positioned to engage the ratchet teeth on the turret during clockwise rotation of the ratchet ring, the upper end of the turret provided with lock holes, a stationary spring actuated lock pin positioned to engage in said lock holes, a wedge on the ratchet ring, an actuating block carried by the lock pin and positioned to be engaged by the wedge to force the lock pin out of engagement with the lock holes, a reach rod pivoted to the actuating arm, a revoluble crank disk engaging the reach rod, and means for revolving the crank disk from the axle of the accessory, substantially as described.

15. In a shocking accessory for a grain harvester, the combination of a longitudinally movable shock-discharging floor, means for supporting the grain shock comprising stationary upright posts, sleeves rotatable about said posts, a jointed horizontal shock supporting arm attached to each of said sleeves, a coil spring about the sleeve having one end fixed to a stationary object and the other end engaged to the sleeve to normally actuate the arm inward across the discharging floor, the outer section of the jointed arm provided with a bell crank on its inner end, a stationary arm fixed to the post, a link pivoted at one end to the bell crank and at the other end to the stationary arm, and catch means on said floor positioned to engage the sleeve and to actuate the arm from its normal position across the discharging floor, substantially as described.

16. In a shocking accessory for a grain harvester, the combination with a rotating turret for receiving and transferring grain shocks, of semi-circular yokes spaced above the turret and attached thereto, a pivoted extension on each of said yokes positioned to embrace the grain shock, a bell-crank on the inner end of said extension, a horizontal link pivoted to the bell-crank, a vertical actuating lever fulcrumed adjacent the center of its length to the rotating turret, said link pivoted to the upper end of the actuating lever, a stationary cam groove positioned to engage the lower end of the actuating lever and to form the path of travel for the lever during rotation of the turret, said cam groove provided with variations spaced to actuate the end of the lever to open and close the pivoted extensions at predetermined points in the operation of the accessory, and a stationary arcuate guard rail disposed to support the unembraced portion of the shock during rotation, substantially as described.

17. In a shocking accessory for a grain harvester, the combination of a bundle placing device comprising a swinging arm, a rotating turret for receiving and transferring the grain shocks, an actuating device for said rotating turret comprising a continuously rotating shaft, a continuation shaft in line with said continuously rotating shaft, means for coupling said shaft at predetermined points in the operation of the device whereby intermittent rotation is transmitted to the continuation shaft, crank disk means operatively connected to said continuation shaft to drive said turret, a second continuously rotating shaft parallel to said continuously rotating shaft, a continuation shaft in line with said second continuously rotating shaft, means for coupling said second shaft and its continuation shaft at predetermined points in the operation of the device whereby a periodical rotation is transmitted to the continuation shaft, and a governing drum mounted on a third shaft rotated by said second continuation shaft and in operative relation with the swinging arm carried by the bundle placing device, substantially as described.

JOHN G. KERST.

Copies of this patent may be obtained for five cents each, by addressing the "Commissioner of Patents, Washington, D. C."